United States Patent
Jung

(10) Patent No.: US 11,067,286 B2
(45) Date of Patent: Jul. 20, 2021

(54) TEMPERATURE CONTROL SYSTEM AND METHOD FOR GRILL

(71) Applicant: PQINET CO., LTD., Seoul (KR)

(72) Inventor: Younghoon Jung, Seoul (KR)

(73) Assignee: PQINET CO., LTD., Seoul (KR)

( * ) Notice: Subject to any disclaimer, the term of this patent is extended or adjusted under 35 U.S.C. 154(b) by 0 days.

(21) Appl. No.: 16/729,394

(22) Filed: Dec. 29, 2019

(65) Prior Publication Data
US 2020/0232647 A1   Jul. 23, 2020

(30) Foreign Application Priority Data
Jan. 22, 2019 (KR) .......................... 10-2019-0008123

(51) Int. Cl.
*F24C 3/12* (2006.01)
*A47J 36/32* (2006.01)
(Continued)

(52) U.S. Cl.
CPC ............... *F24C 3/126* (2013.01); *A47J 36/32* (2013.01); *A47J 37/06* (2013.01); *F23N 1/002* (2013.01); *A47J 2202/00* (2013.01)

(58) Field of Classification Search
CPC .. F24C 3/126; A47J 36/32; A47J 37/06; A47J 2202/00; F23N 1/002
(Continued)

(56) References Cited

U.S. PATENT DOCUMENTS 5,937,847 A * 8/1999 Garceau ..................... F24C 3/12
126/39 H
8,835,816 B2 * 9/2014 McIntyre ............... H05B 6/687
219/506

(Continued)

FOREIGN PATENT DOCUMENTS

JP   06-000131 A   1/1994
JP   06000131 A    1/1994
(Continued)

OTHER PUBLICATIONS

Communication dated Jun. 7, 2019, issued by the Korean Patent Office in counterpart Korean Patent Application No. 10-2019-0008123.

*Primary Examiner* — Jimmy Chou
(74) *Attorney, Agent, or Firm* — Sughrue Mion, PLLC

(57) ABSTRACT

The present invention provides a temperature control system of a grill including a heat source 100 supplying heat to cook a cooking object, a grill 110 cooking the cooking object 120 based on the heat supplied from the heat source 100, a temperature sensor 220 measuring the temperature of the grill 110, a smart controller 200 receiving a value measured in the temperature sensor 220 to check an appropriate temperature according to a cooking object and control the intensity of the heat source, and a controller 500 connected with the smart controller 200 wirelessly to transmit and receive information and controlling the smart controller to control the intensity of the heat source 100, wherein the smart controller 200 transmits a signal according to an appropriate temperature matching result and a cooking step to a user group 310 and the controller 500, an indicator 210 of the smart controller 200 indicates the appropriate temperature matching result and the cooking step, a control window of the controller 500 indicates the appropriate temperature matching result and the cooking step, the user group 310 is configured by a plurality of users equipped with a signal receiver 320, the smart controller 200, the user group 310, and the controller 500 are connected to each other wirelessly through a communicator 300, and when the temperature of the grill 110 is not the appropriate temperature according to the cooking object, the smart controller 200 generates a signal to the user group 310 and the controller 500 so that the user directly controls the grill temperature or the controller 500 automatically controls the
(Continued)

intensity of the heat source to be cooked at an appropriate temperature according to the cooking object.

6 Claims, 10 Drawing Sheets

(51) Int. Cl.
*A47J 37/06* (2006.01)
*F23N 1/00* (2006.01)

(58) Field of Classification Search
USPC .......................... 126/211; 99/333; 236/20 A
See application file for complete search history.

(56) References Cited

U.S. PATENT DOCUMENTS

| | | | | |
|---|---|---|---|---|
| 10,092,129 B2 * | 10/2018 | Jenkins | ................. | A47J 36/321 |
| 10,610,057 B1 * | 4/2020 | Billman | ................. | A47J 36/321 |
| 2004/0016348 A1 * | 1/2004 | Sharpe | .................... | A47J 37/10 |
| | | | | 99/331 |
| 2009/0126714 A1 * | 5/2009 | Barkhouse | ............. | F23N 1/002 |
| | | | | 126/39 G |
| 2009/0183729 A1 * | 7/2009 | Barkhouse | ............. | F23N 1/002 |
| | | | | 126/39 BA |
| 2010/0192784 A1 * | 8/2010 | Shim | ........................ | F24C 7/082 |
| | | | | 99/325 |
| 2010/0213187 A1 * | 8/2010 | Bandholz | ............ | H05B 6/6441 |
| | | | | 219/506 |
| 2011/0132201 A1 * | 6/2011 | Richardson | ............... | F24C 7/08 |
| | | | | 99/325 |
| 2013/0061765 A1 * | 3/2013 | Reinhart | ............ | F24C 15/2007 |
| | | | | 99/329 R |
| 2013/0206015 A1 * | 8/2013 | Jacoby | .................... | A47J 37/07 |
| | | | | 99/330 |
| 2014/0170275 A1 * | 6/2014 | Bordin | ........................ | A23L 5/10 |
| | | | | 426/233 |
| 2014/0295357 A1 * | 10/2014 | McAfee | ................... | H05B 6/12 |
| | | | | 431/6 |
| 2015/0230655 A1 * | 8/2015 | Hoog | ................. | A47J 31/0576 |
| | | | | 426/231 |
| 2015/0257596 A1 * | 9/2015 | Vartanian | ............... | F21V 33/008 |
| | | | | 99/325 |
| 2015/0292749 A1 * | 10/2015 | Kim | .......................... | A23L 5/10 |
| | | | | 426/231 |
| 2016/0028556 A1 * | 1/2016 | Ebrom | ................ | H04L 12/2823 |
| | | | | 709/223 |
| 2016/0051078 A1 * | 2/2016 | Jenkins | ..................... | F24C 3/12 |
| | | | | 99/331 |
| 2016/0123599 A1 * | 5/2016 | Cadima | ................... | F24C 3/126 |
| | | | | 99/331 |
| 2016/0192801 A1 * | 7/2016 | Wu | .......................... | A23L 5/13 |
| | | | | 426/231 |
| 2016/0313002 A1 * | 10/2016 | Johncock | ................ | F23N 5/022 |
| 2017/0191672 A1 * | 7/2017 | Kim | ..................... | H05B 1/0266 |
| 2017/0238751 A1 * | 8/2017 | Vengroff | ................ | F24C 7/087 |
| 2017/0329358 A1 * | 11/2017 | Ferguson | ................ | H04L 67/24 |
| 2017/0332841 A1 * | 11/2017 | Reischmann | ....... | A47J 37/0786 |
| 2018/0010804 A1 * | 1/2018 | Bach | ....................... | F24C 3/126 |
| 2019/0141794 A1 * | 5/2019 | Richcreek | ............... | F24C 7/083 |
| 2019/0203942 A1 * | 7/2019 | Green | ..................... | F24C 3/126 |
| 2019/0212012 A1 * | 7/2019 | Le | .......................... | G08B 21/14 |
| 2019/0289119 A1 * | 9/2019 | Colston | ................. | G08C 17/02 |
| 2019/0301743 A1 * | 10/2019 | Cowan | ..................... | F16K 31/02 |
| 2019/0307289 A1 * | 10/2019 | Palmer | ..................... | F24C 7/085 |
| 2020/0182476 A1 * | 6/2020 | Bentley | ..................... | A62C 2/04 |
| 2020/0182477 A1 * | 6/2020 | Bentley | ................... | F24C 3/126 |
| 2020/0205240 A1 * | 6/2020 | Lee | ......................... | H05B 6/062 |
| 2020/0256563 A1 * | 8/2020 | Cadima | ................. | A47J 36/321 |
| 2020/0408413 A1 * | 12/2020 | Billman | .................. | F24C 3/008 |

FOREIGN PATENT DOCUMENTS

| | | | |
|---|---|---|---|
| JP | U3112891 | | 7/2005 |
| JP | 3112891 U | | 8/2005 |
| JP | 2018-132282 A | | 8/2018 |
| JP | 2018132282 A | | 8/2018 |
| JP | 2018-155414 A | | 10/2018 |
| JP | 2018155414 A | * | 10/2018 |
| JP | 2018155414 A | | 10/2018 |
| KR | 20160086224 A | * | 7/2016 |
| KR | 10-1699231 B1 | | 1/2017 |
| KR | 101699231 B1 | | 1/2017 |

* cited by examiner

TEMPERATURE CONTROL SYSTEM AND METHOD FOR GRILL

TECHNICAL FIELD

The present invention relates to temperature control system and method of a grill and more particularly, to a temperature control system and method of a grill which controls a temperature of a grill by adjusting the intensity of a heat source to an appropriate temperature according to a type of cooking object to prevent burning of the cooking object and cook the cooking object to an appropriate temperature according to a type of cooking object, measures the temperature of the grill by a temperature sensor, transmits the measured temperature of the grill to a user group and a controller by a communicator in a smart controller, and receives a signal by a plurality of users to control the temperature of the grill by the user or check and control a grill temperature state by the controller.

BACKGROUND ART

There are many kinds of utensils for cooking food. Usually, the cooking utensils are classified according to a heat source, and many cooking utensils use gas ranges using city gas or LNG, and the cooking utensils are heated with gas fire to be cooked. Currently, various types of electric ranges have been developed to avoid dangers such as fire.

In addition, there is also a microwave oven using microwaves used to simply heat the frozen food, but the microwave oven is unsuitable for cooking and is often used only for warming.

In general, in the case of grilling various kinds of meat such as beef or pork on a grill, the cooking object is cooked by heating the grill with a heat source and using heat conduction to the cooking object placed on the heated grill. In the cooking process using the grill in the related art, there is a problem that since it is difficult to control the temperature according to a type of meat, even if an operation such as turning the cooking object or transferring the cooking object to the outside of the grill is a little late, the cooking object is blackened. In addition, the cooking process is performed without considering the appropriate temperature of the cooking object, so that an optimal taste at the appropriate temperature of the cooking object cannot be felt, and when the cooking object is burned, a risk of developing benzopyrene, which is a carcinogen harmful to the human body, increases due to incomplete combustion of proteins and fats.

Therefore, there is a need for a temperature control system of a grill that measures the temperature to prevent the cooking object from being burned and enables temperature control.

As prior arts related thereto, in Korean Patent Registration No. 10-1538588 issued on Jul. 21, 2015 (hereinafter, referred to as [Patent Document 1]), there is published a grill for roast. In [Patent Document 1], there is published a grill for grilling which enables various foods to be cooked at the same time according to a taste of an eater in addition to the roast of meat by inserting a cooker having a passage connected with an opening to the opening formed at the center of the grill, heats the cooker with heat of the heat source, and controls the heating temperature.

Further, In Korean Patent Publication No. 10-2011-0043056 published on Apr. 27, 2011 (hereinafter, referred to as [Patent Document 2]), there is published a manual and automatic heating power control and blocking device for controlling a temperature of a roast plate. The [Patent Document 2] relates to a manual and automatic heating power control and blocking device for controlling a temperature of a roast plate and there is published a device designed to automatically control an optimal roasting temperature by installing a heating power blocking plate between a heat source and a grill to manually block the heating power applied to the grill by a user, or detects an actual temperature of the grill according to a selected roasting condition to automatically block or control the heating power applied to the grill according to a change in temperature, in a roasting device in which the heating power cannot be controlled for a short time or the control of the heating power is difficult like a roast using charcoal fire, a coal furnace, and a grill.

However, in [Patent Document 1] in the related art, there is a problem that it is difficult to accurately measure a temperature and control a temperature suitable for a cooking object by adjusting the heat of a heat source through the opening and closing of a connection passage during the temperature control of the grill, and it is required to just manually control the temperature.

In addition, in [Patent Document 2], there is a problem that it is difficult to accurately measure a temperature and control the temperature according to a cooking object by performing functions of measuring the temperature and blocking or adjusting the heating power between the heat source and the grill by using the heating power blocking plate according to a temperature condition.

DISCLOSURE

Technical Problem

[Patent Document 1] Korean Patent Registration No. 10-1538588 issued on Jul. 21, 2015
[Patent Document 2] Korean Patent Publication No. 10-2011-0043056 published on Apr. 27, 2011

DISCLOSURE

Technical Problem

The present invention is to be developed to solve the problems in the related art and an object of the present invention is to provide temperature control system and method of a grill which can control the intensity of a heat source applied to a grill for controlling a temperature of the grill to control the temperature of the grill, perform cooking at an appropriate temperature of a cooking object by measuring and controlling the temperature, generate a signal to a user group and a controller by a communicator, check a grill temperature state by the controller even when the user does not directly control the temperature, control the temperature to an appropriate temperature according to a cooking object, and guide a cooking time of the cooking object to cook the cooking object at appropriate temperature and time.

Technical Solution

A temperature control system of a grill according to one aspect of the present invention includes: a heat source 100 supplying heat to cook a cooking object; a grill 110 cooking the cooking object 120 based on the heat supplied from the heat source 100; a temperature sensor 220 measuring the temperature of the grill 110; a smart controller 200 receiving a value measured in the temperature sensor 220 to check an appropriate temperature according to a cooking object and control the intensity of the heat source; and a controller 500 connected with the smart controller 200 wirelessly to transmit and receive information and controlling the smart controller to control the intensity of the heat source 100, wherein the smart controller 200 transmits a signal according to an appropriate temperature matching result and a cooking step to a user group 310 and the controller 500, an indicator 210 of the smart controller 200 indicates the appropriate temperature matching result and the cooking step, a control window of the controller 500 indicates the appropriate temperature matching result and the cooking step, the user group 310 is configured by a plurality of users equipped with a signal receiver 320, the smart controller 200, the user group 310, and the controller 500 are connected to each other wirelessly through a communicator 300, and when the temperature of the grill 110 is not the appropriate temperature according to the cooking object, the smart controller 200 generates a signal to the user group 310 and the controller 500 so that the user directly controls the grill temperature or the controller 500 automatically controls the intensity of the heat source to be cooked at an appropriate temperature according to the cooking object.

Preferably, the indicator 210 indicates an appropriate temperature of the cooking object and a cooking step according to a cooking time, the indicator 210 emits first color light at the appropriate temperature and emits second color light when the temperature is not the appropriate temperature, the indicator 210 flashes the first color to indicate a turning step alarm state of the cooking object, and the indicator 210 flashes the second color to indicate a cutting step alarm state of the cooking object.

More preferably, the controller includes a control window interworked with a plurality of tables to control the table separately, and the control window includes a table number indicating each table to be interworked; a temperature indicator indicating a current grill temperature detected by the temperature sensor; a cooking object item indicating an ordered menu; an appropriate temperature indicator corresponding to the temperature indicator to indicate an appropriate temperature of the cooking object item; a progress step indicator indicating a cooking progress step of the cooking object item; a progress step timer indicating an appropriate cooking time of the cooking object item in the progress step indicator; and a progress step alarm unit guiding a measure to be taken over time for cooking the cooking object according to the progress step timer.

Also preferably, the appropriate temperature of the cooking object is 225° C. to 235° C. when the cooking object is beef and 245° C. to 255° C. when the cooking object is pork.

Also preferably, the progress step alarm unit of the control window flashes the first color and indicates a turning step alarm when the time for cooking one side of the cooking object elapses and flashes the second color and generates an alarm warning signal when the time for cooking the other side thereof elapses.

Also preferably, the appropriate temperature indicator indicates the appropriate temperature of the cooking object, indicates the first color at the appropriate temperature and indicates the second color when the temperature is not the appropriate temperature, the progress step alarm unit flashes the first color (green) to indicate a turning step alarm state of the cooking object, and the progress step alarm unit flashes the second color to indicate a cutting step alarm state of the cooking object.

A temperature control method of a grill according to another aspect of the present invention includes: (a) inputting, by a controller, a cooking object item; (b) detecting, by a temperature sensor, a temperature of a grill on which the cooking object is cooked; (c) checking an appropriate temperature by matching the temperature of the grill with the cooking object input by the controller; (d) checking the appropriate temperature in step (c), indicating a matching result on a control window and an indicator of the controller, and transmitting the matching result to a user group; (e) determining whether it is required to control the temperature depending on an appropriate temperature according to the matching result, wherein in step (e), if the temperature control is required, the process proceeds to a user alarm and grill temperature control step and if the temperature control is not required, the process proceeds to a cooking progress step indication and user alarm step; (f) controlling the intensity of the heat source so as to manually control the temperature of the grill by the user or automatically control the temperature of the grill by the controller to be set to the appropriate temperature by checking the appropriate temperature according to the cooking object when it is determined that it is required to control the temperature in step (e); (g) generating a signal by the control window of the controller and the indicator of the smart controller to take a measure to be performed over time required for cooking the cooking object and transmitting the signal to the user group; and (h) determining whether there is a cooking object to be additionally cooked after step (g), proceeding to the grill temperature detecting step when there is the cooking object to be additionally cooked, and terminating the step when there is no cooking object to be additionally cooked.

Advantageous Effects

According to the temperature control system and method of the grill of the present invention, first, it is possible to prevent the cooking object from being burnt by measuring the temperature of the grill in real time by the temperature sensor and cooking the cooking object at a temperature set according to a type of cooking object. Second, it is possible to maximizing the taste of the cooking object by guiding and indicating the cooking object to be cooked according to appropriate temperature and time. Third, it is possible to take a measure immediately according to a cooking state of the cooking object by generating a signal of the cooking state of the cooking object to the user group and the controller.

MODES OF THE INVENTION

The present invention will be described below in detail with reference to the accompanying drawings.

A temperature control system of a grill of the present invention will be described in detail with reference to FIGS. 1 to 4.

Figure 1:
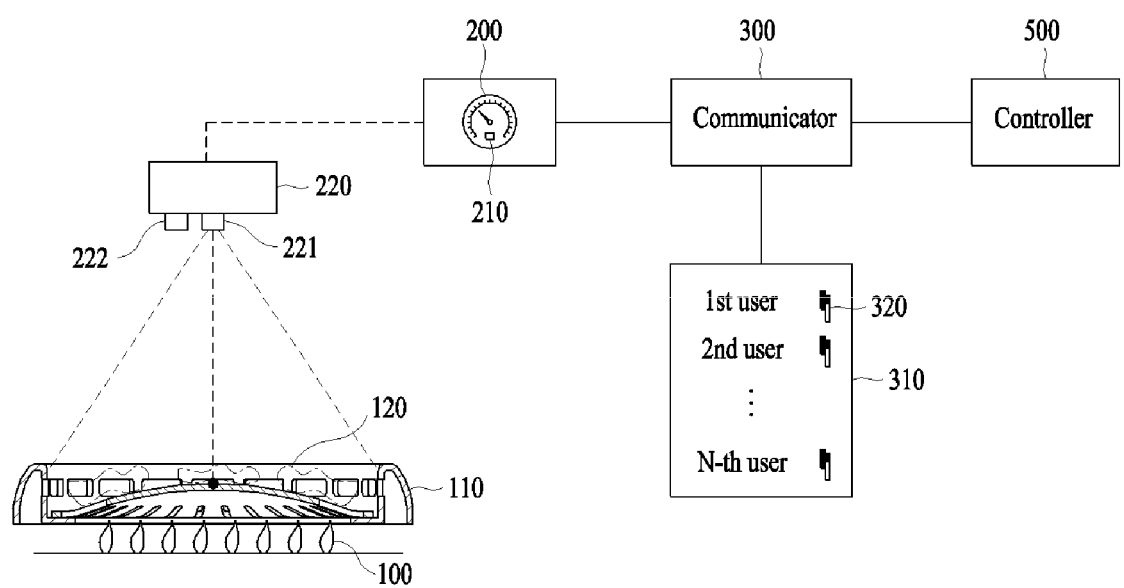
FIG. 1 is a schematic view of a temperature control system of a grill of the present invention.
Figure 2:
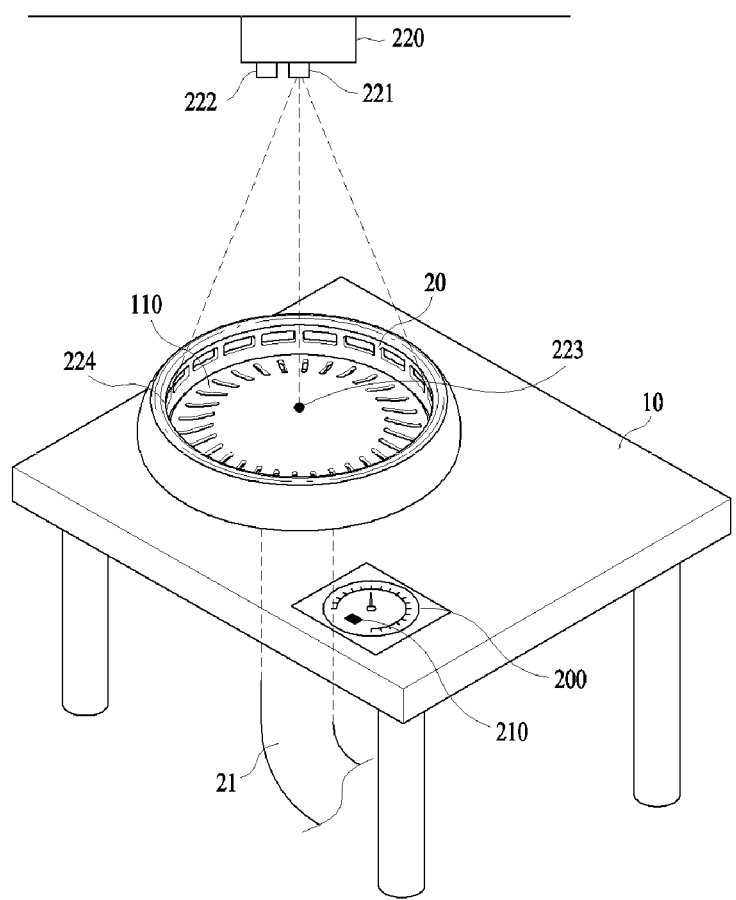
FIG. 2 is a schematic view of a temperature control system of a grill according to an embodiment of the present invention.
Figure 3:
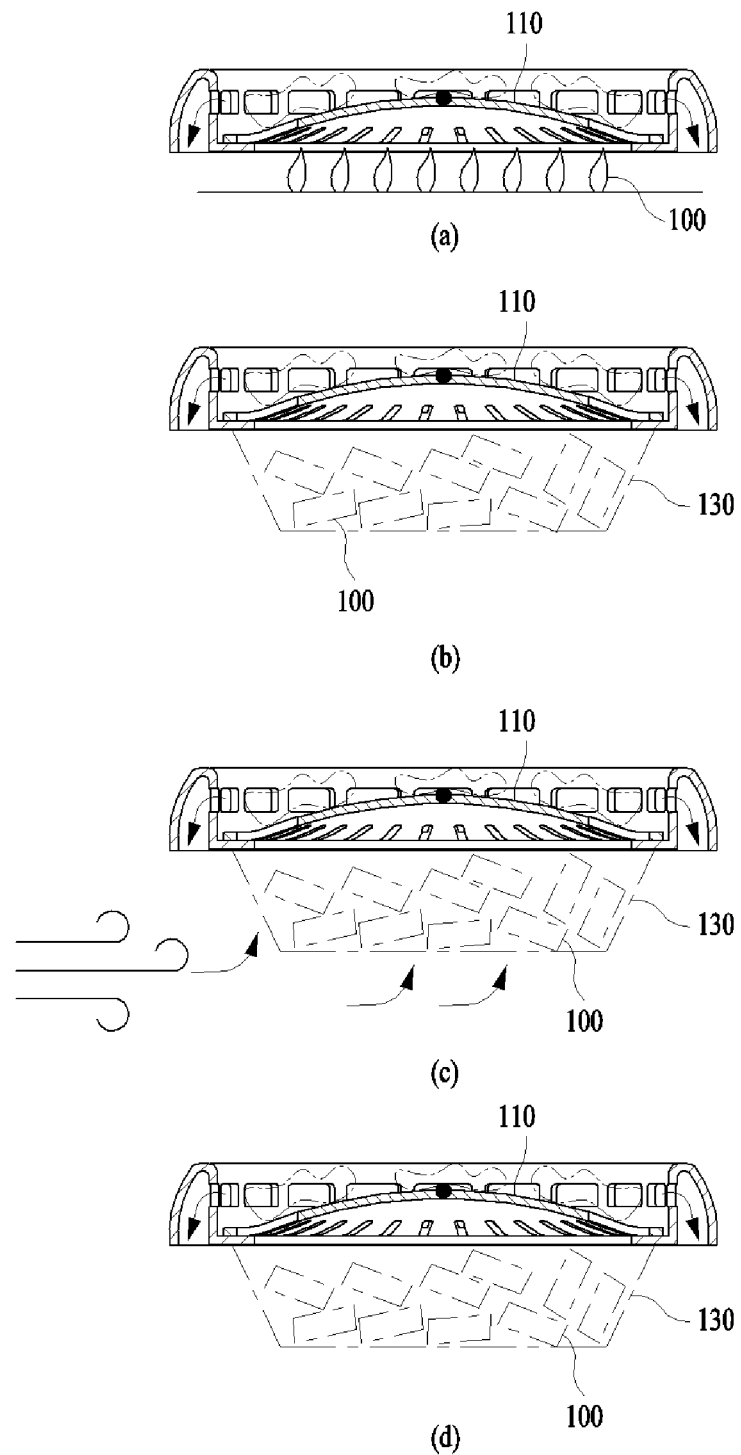
FIG. 3 is a configuration of the grill according to the embodiment of the present invention and a temperature control method.
Figure 4:
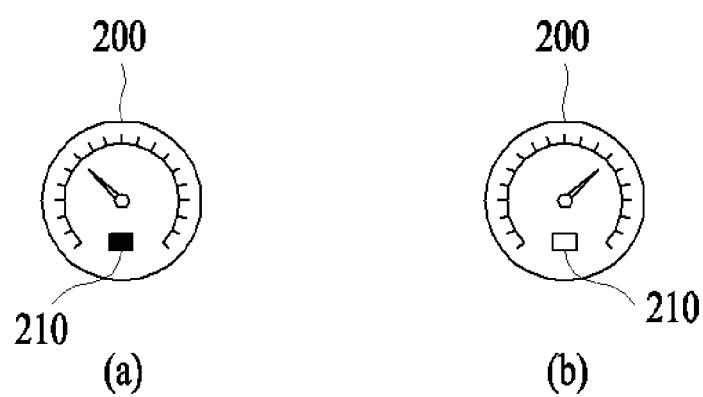
FIG. 4 is an operational configuration view of a smart controller according to the embodiment of the present invention.

FIG. 1 is a schematic view of a temperature control system of a grill of the present invention, FIG. 2 is a schematic view of a temperature control system of a grill according to an embodiment of the present invention, FIG. 3 is a configuration of the grill according to the embodiment of the present invention and a temperature control method, and FIG. 4 is an operational configuration view of a smart controller according to the embodiment of the present invention.

Referring to FIG. 1, the temperature control system is constituted by a heat source 100 supplying heat to cook a cooking object 120, a grill 110 cooking the cooking object 120 based on the heat supplied from the heat source 100, a temperature sensor 220 measuring the temperature of the grill 110, a smart controller 200 checking an appropriate temperature and a cooking time according to the cooking object 120 and controlling the intensity of the heat source 100, and a controller 500 controlling the intensity of the heat source 100 and checking and indicating the appropriate temperature and the cooking time according to the cooking object.

Next, the temperature sensor 220 and the smart controller 200 are connected to each other by wireless pairing as Bluetooth communication, and the smart controller 200 includes an indicator 2110 indicating an appropriate temperature and a cooking step according to the cooking object.

When the cooking object is input from the controller 500, the controller 500 transmits a cooking object list to the smart controller 200 via wireless communication WiFi through the communicator 300, the smart controller 200 receives a value measured in the temperature sensor 220 and checks a result of matching the appropriate temperature of the cooking object to transmit the checked matching result to a plurality of users as a user group 310 and the controller 500 through the communicator 300 and indicate the matching result on a control window of the controller and the indicator 210, and the controller 500 and the smart controller 200 transmits and receives information on the appropriate temperature for the cooking object and the cooking step according to the cooking time to each other.

Further, the user group 310 is characterized to receive a signal transmitted from the smart controller 200 or receive a signal (e.g., "above an appropriate temperature at table 1", "a turning step at table 3", and "a cutting step at table 7") transmitted from the controller 500 by separately mounting a signal controller 320 (e.g., an inear device and a display device) on a plurality of users (a first user, a second user to an n-th user).

Further, the temperature sensor 220 is configured by a laser pointer 221 capable of proceeding spot side light and average side light of the grill by zoom in and zoom out operations when the temperature is measured and a measurer 222 measuring radiant energy emitted by an object. The communicator 300 is connected with the smart controller 200, the user group 310, and the controller 500 via wireless communication WiFi and the smart controller 500 transmits the result of matching the appropriate temperature of the cooking object and the signal of the cooking step to the user group 310 and the controller 500 to minimize involvement of a guest and a plurality of users (e.g., workers) directly controls the temperature of the grill or the controller 500 automatically controls the grill to an appropriate temperature according to the cooking object.

Referring to FIG. 2, the grill 110 for cooking the cooking object is disposed on the table 10, the grill 110 is provided with an exhaust unit 20 for soaking the smoke generated when the cooking object is cooked, the exhaust unit 20 is connected with a duct 21 exhausting the sucked smoke downward of the grill 110 and disposed with the temperature sensor 220 capable of measuring the temperature of the grill upward of the grill 110. The temperature sensor 220 is configured by a laser pointer 221 capable of proceeding spot side light 223 and average side light 224 of the grill by zoom in and zoom out operations when the temperature is measured and a measurer 222 measuring radiant energy emitted by an object. The spot side light 223 may measure the temperature of the grill 110 at one point of the center of the grill 110 when the cooking object is cooked and the average side light 224 measures an average temperature of the grill 110 when the cooking object is first placed on the grill 110 and the cooking object is added. At this time, the temperature sensor 220 is a sensor which detects a physical amount or chemical amount such as a temperature, a pressure, and an radiation intensity to convert the physical or chemical amount to an electric amount to be processed, and may use an infrared sensor capable of accurately measuring the temperature without a contact, but if the sensor may sense the temperature, it does not matter that any temperature sensor may be used.

Further, when the cooking object is cooked by the grill 110, the smart controller 200 capable of controlling the intensity of the heat source according to the cooking object and the indicator 210 indicating the appropriate temperature according to the cooking object and the cooking step according to the cooking time was illustrated. The temperature sensor 220 and the smart controller 200 are connected to each other via wireless communication (Bluetooth) and the grill temperature measured by the temperature sensor 220 is received from the smart controller 200 and transmitted to the user group and the controller.

Referring to FIG. 3, FIG. 3A illustrates that the heat source 100 supplying the heat for cooking the cooking object may be configured as a heat source using gas as fuel like a gas range, and the smoke generated when the cooking object is cooked is emitted to the grill 110 cooking the cooking object and the exhaust port of the exhaust unit 20 provided in the grill 110 based on the heat supplied from the heat source 100, and FIG. 3B illustrates that charcoal is used as fuel and the charcoal is burnt to be used as the heat source 100.

Further, the intensity (heating power) of the heat source is controlled by adjusting the temperature of the grill 110 to the appropriate temperature in the smart controller, and in the case of a heat source using gas as fuel, the intensity (heating power) is controlled by a supply amount of the gas and in the case of a heat source using charcoal as fuel, the intensity is controlled by the wind supply and blocking device 130. FIG. 3C illustrates that the heat power is increased by supplying the wind to the charcoal and FIG. 3B illustrates that the heat power is decreased and controlled by blocking the wind from the charcoal.

Next, referring to FIG. 4, the smart controller 200 controls the intensity of the heat source according to the cooking object. FIG. 4A illustrates the indicator 210 which indicates an appropriate temperature of the cooking object according to the temperature control of the smart controller 200 and a cooking step according to an appropriate cooking time, in which when the indicator lights on green light, the temperature shows the appropriate temperature of the cooking object and when the indicator 210 flashes green, a time required for turning and cooking the cooking object elapses and the step should be guided to the turning step. FIG. 4B illustrates that when the indicator 210 lights on red light, the temperature is not the appropriate temperature and when the indicator 210 flashes red, the cooking of the cooking object is completed and the step should be guided to a cutting step.

Next, a controller of the present invention will be described in detail with reference to FIGS. 5 to 7.

Figure 5:
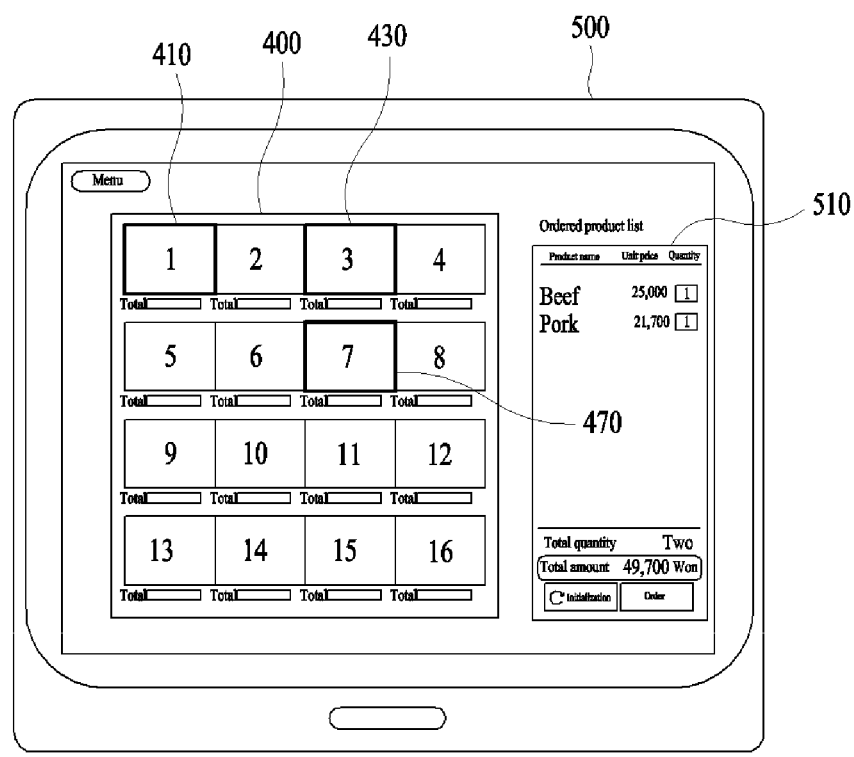
FIG. 5 is a schematic view of a controller of the present invention.
Figure 6:
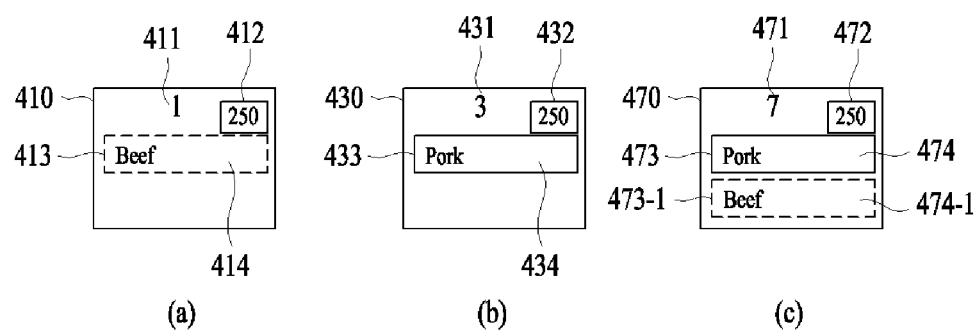
FIG. 6 is a first embodiment of the controller of the present invention.
Figure 7:
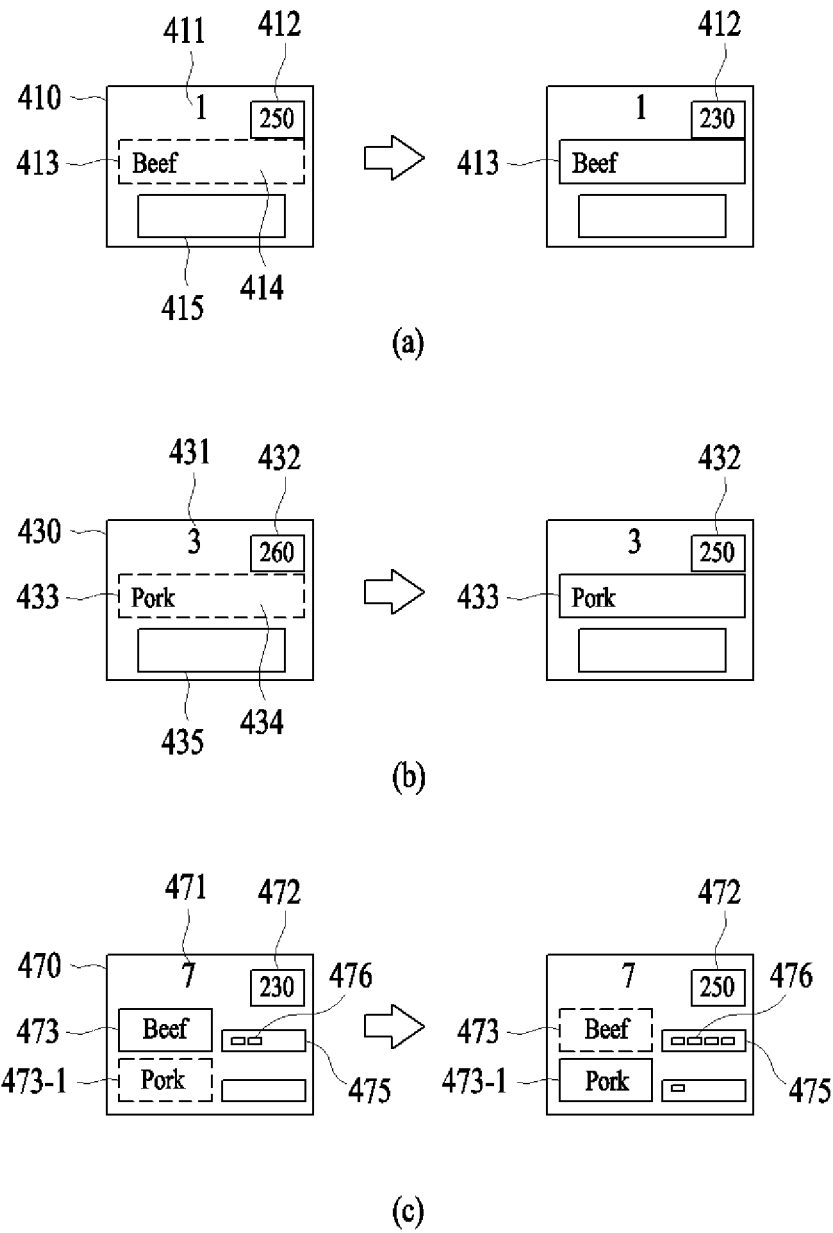
FIG. 7 is a second embodiment of the controller of the present invention.

FIG. 5 is a schematic view of a controller of the present invention, FIG. 6 is a first embodiment of the controller of the present invention, and FIG. 7 is a second embodiment of the controller of the present invention.

FIG. 5 illustrates a schematic view of the controller of the present invention, and the controller 500 may be used as a device (POS device, counter, etc.) performing orders and calculation in a restaurant and includes a cooking object list 510 representing a menu ordered in the restaurant and a control window 400 capable of controlling the smart controller to control the a state alarm indication of the table and the intensity of the heat source. The control window is configured by a plurality of control windows by including a first control window 410, a second control window 430, and a third control window 470 which are detailed control windows for each table to control separately the state indication of each table and the smart controller installed in the table.

Further, the controller 500 is interworked with a smart phone 550 via wireless communication to perform a function of the controller 500 even in the smart phone.

Referring to FIGS. 6 and 7, as an example of the controller, the controller is connected with the smart controller of each table to separately control the smart controller. In the configuration of the first control window 410, the second control window 430, and the third control window 470 as the control window, first, when describing the first control window 410 of FIG. 6A, the first control window 410 indicates connection with the table and is configured by a first table number 411 indicating a table number, a first temperature indicator 412 indicating a current grill temperature, a first cooking object item 414 indicating an ordered menu, and a first appropriate temperature indicator 413 corresponding to the first temperature indicator 412 to indicate whether a cooking temperature of the first cooking object item 414 is an appropriate temperature, in which when a cooking temperature for a current cooking object item is not the appropriate temperature, the first appropriate temperature indicator 413 is indicated to a red color.

Next, when describing the second control window 430 of FIG. 6B, the second control window 430 is configured by a second table number 431 indicating a table number, a second temperature indicator 432 indicating a current grill temperature, a second cooking object item 434 indicating an ordered menu, and a second appropriate temperature indicator 433 corresponding to the second temperature indicator 432 to indicate whether a cooking temperature of the second cooking object item 434 is an appropriate temperature, in which when a cooking temperature for a current cooking object item is the appropriate temperature, the second appropriate temperature indicator 433 is indicated to a green color.

Next, when describing the third control window 470 of FIG. 6C, the third control window 470 is configured by a third table number 471 indicating a table number, a third temperature indicator 472 indicating a current grill temperature, a third cooking object item 474 indicating an ordered menu, and a third appropriate temperature indicator 473 corresponding to the third temperature indicator 472 to indicate whether a cooking temperature of the third cooking object item 474 is an appropriate temperature, in which when a cooking temperature for a current cooking object item is the appropriate temperature, the third appropriate temperature indicator 473 is indicated to a green color and in the case where there are a plurality of cooking object items, a fourth appropriate temperature indicator 473-1 of a fourth cooking object item 474-1 as an additional cooking object item indicates a red color when the cooking temperature is not the appropriate temperature.

Next, in FIG. 7A, in the case where the first cooking object item 414 of the first control window 410 is beef, when the appropriate temperature is set to 225° C. to 235° C., the temperature of the first temperature indicator 412 is set to 250° C., which is higher than the set temperature and not the appropriate temperature, and thus the first appropriate temperature indicator 413 indicates to a red color. At this time, when the temperature of the grill is immediately changed and controlled to the appropriate temperature (225° C. to 235° C.) by touching the first control window 410 of the controller or a predetermined time elapses, the controller automatically controls the temperature of the grill and then the first appropriate temperature indicator 413 is changed and indicated to a green color.

Further, a first progress step indicator 415 may check the cooking time of the cooing object, and the first progress step indicator 415 is generated at the same time as the order, a timer gauge is filled after a predetermined time, and a speed at which the timer gauge is filled is adjusted according to a cooking object item so that the timer gauge guides to be cooked at an appropriate temperate and an appropriate time.

In FIG. 7B, in the case where the second cooking object item 434 of the second control window 430 is pork, when the appropriate temperature is set to 245° C. to 255° C., the temperature of the second temperature indicator 432 is set to 260° C., which is higher than the set temperature and not the appropriate temperature, and thus the second appropriate temperature indicator 433 indicates to a red color. At this time, when the temperature of the grill is immediately changed and controlled to the appropriate temperature (245° C. to 255° C.) by touching the second control window 430 of the controller or a predetermined time elapses, the controller automatically controls the temperature of the grill to the appropriate temperature.

In FIG. 7C, in the case where beef and pork as the plurality of cooking object items of the third control window 470 are set as the cooking object items together, when the appropriate temperature is set to 225° C. to 235° C., the temperature of the third temperature indicator 472 is 230° C. and in the cooking object item, beef at the appropriate temperature, the third appropriate temperature indicator 473 is indicated to a green color, and in the case of pork at less than the appropriate temperature, the fourth appropriate temperature indicator 473-1 is indicated to the red color when the temperature is not the appropriate temperature.

Further, when the cooking of beef of the cooking object items is completed, the appropriate temperature is changed to a temperature (245° C. to 255° C.) suitable for the pork cooking object, the changed temperature may be checked in the third temperature indicator 472 (250° C.), the third appropriate temperature indicator is indicated to the red color, a second progress step timer 476 of a third progress step indicator 475 may check that the cooking of beef of the cooking object items is completed and the second progress step timer 476 is controlled to the appropriate temperature of the pork of the cooking object items to be cooked.

Figure 8:
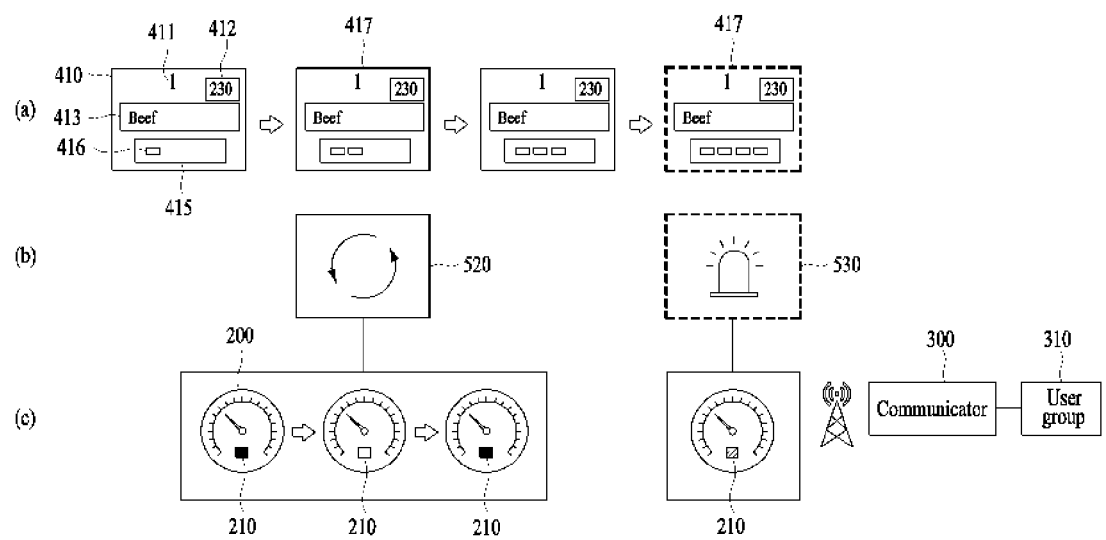
FIG. 8 is an embodiment of the temperature control system of the grill of the present invention.
Figure 9:
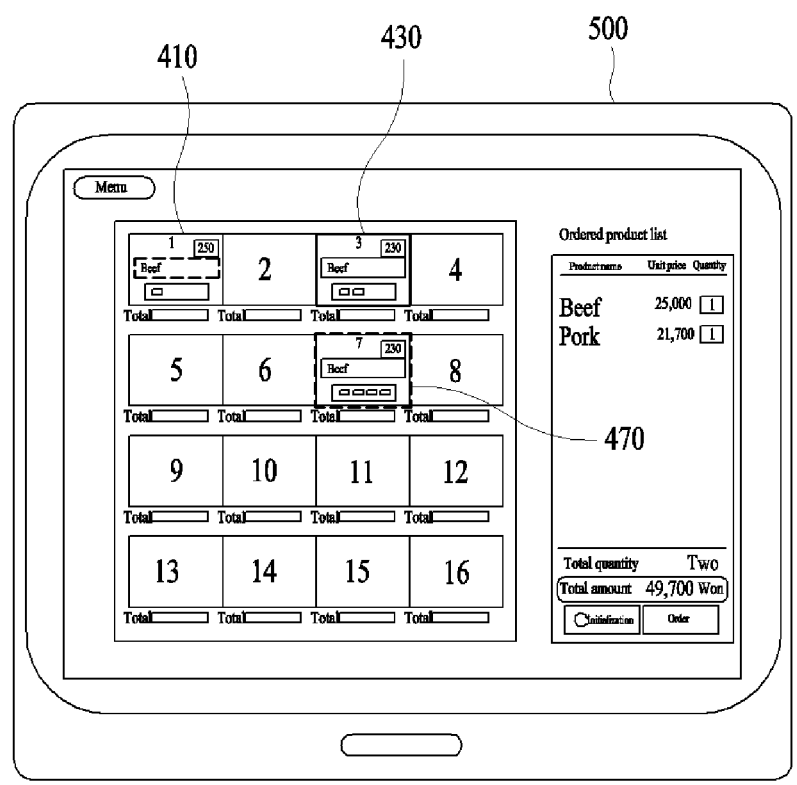
FIG. 9 is an operational configuration view of the controller of the present invention.
Figure 10:
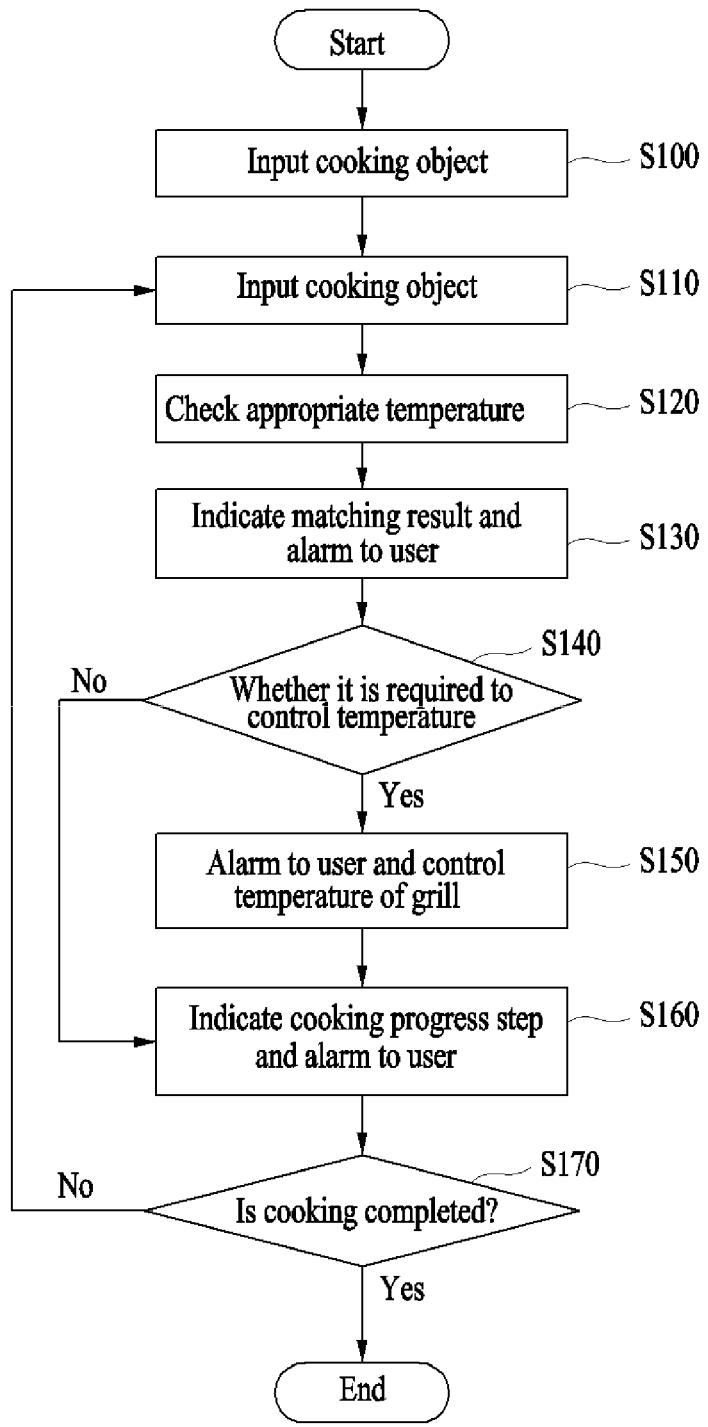
FIG. 10 is a flowchart of a temperature control method of a grill according to the present invention.

Next, FIG. 8 is an embodiment of the temperature control system of the grill of the present invention, FIG. 9 is an operational configuration view of the controller of the present invention, and FIG. 10 is a flowchart of a temperature control method of a grill according to the present invention.

Referring to FIG. 8, the temperature of the grill can be controlled by the control window of the controller for controlling the grill temperature, and the control window may check the cooking step of each table by the table number and indicates that the grill temperature can be controlled for each table.

Next, the first temperature indicator 412 indicates the current grill temperature detected by the temperature sensor and indicates the first appropriate temperature indicator 413 capable of checking whether the corresponding temperature is a temperature suitable for the cooking object item and the first progress step timer 416 of the first progress step indicator 415 capable of checking the cooking time of the cooking object.

More specifically, when a time required for cooking one side of the cooking object elapses, the first control window 410 flashes green by the progress step alarm unit 417 and a turning step alarm 520 is indicated, and when a time required for cooking the other side of the cooking object elapses, the first control window 410 flashes red by the progress step alarm unit 417, and additionally, a signal of a cutting step alarm 530 when the cooking is completed is generated by an alarm warning to guide a measure to be taken over the cooking time of the cooking object.

Further, the smart controller 200 interworked with an operation state of the controller flashes green in the turning step alarm 510 and flashes red in the cutting step alarm 530 by the indicator 210, and generates a signal in the user group 310 to cook the cooking object at an appropriate temperature and an appropriate time by checking the signal even by the user.

Referring to FIG. 9, in the control window of the controller 500, the first control window 410 indicates that a grill temperature of table 1 is to be adjusted when the grill temperature for the cooking object item is not an appropriate temperature. The second control window 430 guides a cooking object of table 3 so that the cooking of one side thereof is completed and then the other side is cooked when the grill temperature for the cooking object item is the appropriate temperature and the turning step alarm is indicated. The third control window 470 guides a cooking object of table 7 so that both one side and the other side thereof is cooked when the grill temperature for the cooking object item is the appropriate temperature and the cutting step alarm is indicated to check a cooking state of each table by the control and the indication of the controller, and generates a signal in the user group to perform the cooking at an appropriate temperature and an appropriate time according to a cooking object while minimizing involvement of a guest.

A flowchart of a temperature control method of a grill of the present invention will be described below with reference to FIG. 10.

Step S100: First, an order, that is, a cooking object item is input by the controller, and information on the input cooking object items is transmitted to the smart controller of the corresponding table.

Step S110: The temperature of the grill on which the cooking object is cooked is detected by the temperature sensor and transmitted to the smart controller.

Step S120: The smart controller checks an appropriate temperature by matching the temperature of the grill with the cooking object input by the controller in real time.

Step S130: The result of checking and matching the appropriate temperature in step S120 is indicated on the control window and the indicator of the controller and transmitted to the user group.

Step S140: It is determined whether it is required to control the temperature according to the appropriate temperature according to the matching result in step S130. If the temperature control is required, the process proceeds to the next step (S150), and if the temperature control is not required, the process proceeds to a cooking progress step indication and user alarm step (S160).

Step S150: When it is determined that it is required to control the temperature in step S140, the smart controller checks the appropriate temperature according to a cooking object, transmits the signal to the user group and the controller, and controls the intensity of the heat source manually by the user or automatically by the controller so as to be set to the appropriate temperature.

Step S160: The controller and the indicator of the smart controller indicate a measure to be taken over time required for cooking the cooking object and transmits the signal to the user group.

Step S170: It is determined whether there is a cooking object to be additionally cooked, and when there is the cooking object to be additionally cooked, the process proceeds to the grill temperature detection step (S110) and when there is no cooking object to be additionally cooked, the temperature control method of the grill is terminated.

The present invention can be applied to the temperature control system and method of the grill by various modifications by those skilled in the art and the category of techniques that are easily technically modified should be also be recognized within the scope of the present invention.

EXPLANATION OF REFERENCE NUMERALS AND SYMBOLS

| | |
|---|---|
| 10: Table | 20: Exhaust unit |
| 21: Duct | 100: Heat source |
| 110: Grill | 120: Cooking object |
| 130: Wind supply and blocking device | 200: Smart controller |
| 210: Indicator | 220: Temperature sensor |
| 221: Laser pointer | 222: Measurer |
| 223: Spot side light | 224: Average side light |
| 300: Communicator | 310: User group |
| 320: Signal receiver | 400: Control window |
| 410: First control window | 411: First table number |
| 412: First temperature indicator | 413: First appropriate temperature indicator |
| 414: First cooking object item | 415: First progress step indicator |
| 416: First progress step timer | 417: Progress step alarm unit |

-continued

| | | | |
|---|---|---|---|
| 430: | Second control window | 431: | Second table number |
| 432: | Second temperature indicator | 433: | Second appropriate temperature indicator |
| 434: | Second cooking object item | 435: | First progress step indicator |
| 470: | Third control window | 471: | Third table number |
| 472: | Third temperature indicator | 473: | Third appropriate temperature indicator |
| 473-1: | Fourth appropriate temperature indicator | 474: | Fourth cooking object item |
| 474-1: | Fourth cooking object item | 475: | Fourth progress step indicator |
| 476: | Second progress step timer | 500: | Controller |
| 510: | Cooking object list | 520: | Turning step alarm |
| 530: | Cutting step alarm | 550: | Smart phone |

What is claimed is:

1. A temperature control system for a grill comprising:
a heat source (100) for supplying heat to cook a cooking object (120);
a grill (110) for cooking the cooking object (120) based on the heat supplied from the heat source (100);
a temperature sensor (220) for detecting a temperature of the grill (110);
a smart controller (200) for receiving the detected temperature from the sensor (220) to check proper temperature according to the cooking object (120) and control an intensity of the heat source (100); and
a controller (500) communicated with the smart controller (200) wirelessly to transmit and receive information for controlling the smart controller (200) to adjust the intensity of the heat source (100),
wherein the smart controller (200) transmits a signal according to the proper temperature matching result and a cooking step to a user group (310) and the controller (500),
an indicator (210) of the smart controller (200) displays the proper temperature matching result and the cooking step,
a control window of the controller (500) displays the proper temperature matching result and the cooking step,
the user group (310) is configured by a plurality of users equipped with a signal receiver (320),
the smart controller (200), the user group (310), and the controller (500) are connected each other wirelessly through a communicator (300), and
when the temperature of the grill (110) is not the proper temperature according to the cooking object, the smart controller (200) generates a signal to the user group (310) and the controller (500) so that the user group (310) directly adjusts the temperature of the grill (110) or the controller (500) automatically controls the intensity of the heat source (100) to the proper temperature according to the cooking object (120).

2. The temperature control system for the grill of claim 1, wherein the indicator (210) displays the proper temperature of the cooking object (120) and a cooking step according to a cooking time,
the indicator (210) emits first color light at the proper temperature and emits second color light when the temperature of the grill (110) is not the proper temperature,
the indicator (210) flashes the first color light to indicate a turning step alarm state of the cooking object (120), and
the indicator (210) flashes the second color light to indicate a cutting step alarm state of the cooking object (120).

3. The temperature control system for the grill of claim 1, wherein the controller (500) includes a control window interworked with a plurality of tables to control the tables separately, and
the control window includes:
a table number indicating each table to be interworked;
a temperature indicator displaying a current grill temperature detected by the temperature sensor;
the cooking object indicating an ordered menu;
an appropriate temperature indicator corresponding to the temperature indicator to display the proper temperature of the cooking object;
a progress step indicator displaying a cooking progress step of the cooking object;
a progress step timer displaying an appropriate cooking time of the cooking object in the progress step indicator; and
a progress step alarm unit guiding a measure to be taken over time for cooking the cooking object according to the progress step timer.

4. The temperature control system for the grill of claim 1, wherein a proper cooking temperature range for beef is between 225° C. and 235° C. and a proper cooking temperature range for pork is between 245° C. and 255° C.

5. The temperature control system for the grill of claim 3, wherein the progress step alarm unit of the control window flashes first color light for indicating a flipping step when the time for cooking one side of the cooking object elapses and flashes second color light and generates an alarm warning signal when the time for cooking the other side of the cooking object elapses.

6. The temperature control system for the grill of claim 3, wherein the appropriate temperature indicator displays the proper temperature of the cooking object, displays first color light at the proper temperature and displays second color light when the temperature of the grill is not the proper temperature,
the progress step alarm unit flashes the first color light to indicate a flipping step alarm state of the cooking object, and
the progress step alarm unit flashes the second color light to indicate a cutting step alarm state of the cooking object.

* * * * *